(12) United States Patent
Bostwick (10) Patent No.: US 6,909,210 B1
(45) Date of Patent: Jun. 21, 2005

(54) COOLING SYSTEM FOR DYNAMOELECTRIC MACHINE

(75) Inventor: Peter Bostwick, St. Louis, MO (US)

(73) Assignee: Emerson Electric Co., St. Louis, MO (US)

(*) Notice: Subject to any disclaimer, the term of this patent is extended or adjusted under 35 U.S.C. 154(b) by 0 days.

(21) Appl. No.: 10/774,228

(22) Filed: Feb. 6, 2004

(51) Int. Cl.$^7$ ................................................ H02K 9/00
(52) U.S. Cl. ............................ 310/52; 310/58; 310/254
(58) Field of Search ..................... 310/52–59, 89, 310/254, 258–259

(56) References Cited

U.S. PATENT DOCUMENTS

| | | | |
|---|---|---|---|
| 1,507,606 A | * | 9/1924 | Kando .................. 310/54 |
| 2,862,120 A | | 11/1958 | Onsrud |
| 3,601,884 A | | 8/1971 | Kemeny |
| 3,739,323 A | | 6/1973 | Spors |
| 3,963,950 A | | 6/1976 | Watanabe et al. |
| D245,498 S | | 8/1977 | Andreas |
| 4,289,985 A | * | 9/1981 | Popov et al. .................. 310/61 |
| 4,354,725 A | | 10/1982 | Herbaugh et al. |
| 4,516,044 A | | 5/1985 | Bone |
| 4,854,373 A | | 8/1989 | Williams |
| D304,169 S | | 10/1989 | Hoshino et al. |
| D306,009 S | | 2/1990 | Mintz et al. |
| 4,912,350 A | | 3/1990 | Parshall et al. |
| 4,959,570 A | | 9/1990 | Nakamura et al. |
| 5,059,846 A | | 10/1991 | Concannon |
| 5,084,642 A | | 1/1992 | Katsuzawa et al. |
| D349,887 S | | 8/1994 | Page |
| 5,585,681 A | | 12/1996 | Bitsche |
| 5,592,039 A | | 1/1997 | Guardiani |
| 5,616,973 A | | 4/1997 | Khazanov et al. |
| 5,731,643 A | | 3/1998 | Avakian et al. |
| 5,773,903 A | | 6/1998 | McCabria et al. |
| 5,808,386 A | | 9/1998 | Willyoung |
| 5,859,482 A | | 1/1999 | Crowell et al. |
| 5,880,547 A | | 3/1999 | Shoykhet |
| 5,906,236 A | | 5/1999 | Adams et al. |
| 5,929,543 A | | 7/1999 | Zeyen et al. |
| 5,939,807 A | | 8/1999 | Patyk et al. |
| 5,939,808 A | | 8/1999 | Adames |
| 5,997,261 A | | 12/1999 | Kershaw et al. |
| 6,087,744 A | | 7/2000 | Glauning |
| 6,124,655 A | | 9/2000 | Jeske |
| 6,129,477 A | | 10/2000 | Shoykhet |
| 6,133,659 A | | 10/2000 | Rao |
| 6,300,693 B1 | | 10/2001 | Poag et al. |
| 6,322,332 B1 | | 11/2001 | Jensen et al. |
| 6,617,715 B1 | | 9/2003 | Harris et al. |
| 6,674,198 B2 | * | 1/2004 | Gubbels .................. 310/89 |
| 6,844,638 B2 | * | 1/2005 | Vasilescu .................. 310/62 |

* cited by examiner

Primary Examiner—Thanh Lam
(74) Attorney, Agent, or Firm—Harness, Dickey & Pierce, P.L.C.

(57) ABSTRACT

A dynamoelectric machine having a cooling system for removing heat uniformly about the machine. The machine includes a cooling jacket defining a flow path for liquid coolant which extends circumferentially of the machine and which reduces loss of coolant pressure. An endshield of the machine is configured for holding electronic components in arrangement integrated with the machine. The endshield has a flow passage for receiving the coolant to remove heat from the electronic components. The flow passage of the endshield and the flow path of the cooling jacket are serially arranged so that the coolant removes heat sequentially from the electronic components and a stator of the machine.

15 Claims, 8 Drawing Sheets

COOLING SYSTEM FOR DYNAMOELECTRIC MACHINE

BACKGROUND OF THE INVENTION

This invention relates generally to systems for cooling dynamoelectric machines, and in particular to a cooling jacket and endshield which direct a flow of fluid for removing heat from an integrated starter generator and associated electronics.

Dynamoelectric machines such as electric motors generate heat during operation which may degrade efficiency or damage component parts, such as windings and bearings. Consequently, a machine is typically cooled during operation by a coolant which is circulated through passages in or around the motor to transport heat energy away from hot parts. Cooling is particularly challenging for a relatively small or compact machine, such as an integrated starter generator for an automotive vehicle. That machine must be packaged so that it occupies only a relatively small space in a vehicle engine compartment (e.g., maximum length and diameter dimensions of about six inches), which limits the amount of space available to accommodate coolant passages.

One cooling approach which has been adopted is to install a cooling jacket around the outer circumference of the stator core of a dynamoelectric machine. The jacket receives a coolant which is circulated through passages in the jacket to remove heat generated in the stator windings and core during operation. Typically, the coolant is a liquid because it produces a relatively higher convective heat transfer coefficient than a gaseous coolant, and consequently the passages are smaller and the system can provide greater heat dissipation capacity.

Prior cooling jackets have suffered from various drawbacks, including tortuous paths of travel through the jackets that subject the liquid coolant to numerous flow deflections and turns which result in high total pressure drop. That penalizes performance and can require larger pumps, such as water pumps in automotive vehicles, to produce adequate circulation. Further, some previous cooling jackets have non-uniform distributions of coolant between flow passages within the jackets, resulting in localized hot spots on the stator core. Complex sealing arrangements have been required for preventing leaks of coolant. Moreover, electronic components associated with dynamoelectric machines, such as electronic controls, have typically been held in a housing remote from the motors. This arrangement requires additional space, longer electronic connections, and makes proper cooling more difficult.

SUMMARY OF THE INVENTION

Among the several objects and features of the present invention may be noted the provision of a dynamoelectric machine having a cooling system for removing heat from the machine; the provision of such a machine wherein the cooling system cools uniformly about the machine; the provision of such a machine and cooling system wherein the coolant pressure drop is minimized; the provision of such a machine and cooling system which seal against leaks of coolant; the provision of such a machine and such a cooling system having integrated electronic components which are cooled along with the machine; the provision of such a machine which is small in size; and the provision of such a machine which is economical.

In general, a cooling jacket according to the present invention is for cooling a stator of a dynamoelectric machine. The jacket comprises an annular inner shell having a generally cylindric inner surface defining a cavity for receiving the stator so that the stator is in heat transfer contact with the inner surface. The inner shell has a central longitudinal axis and an outer surface. An annular outer shell is for nesting coaxial alignment with the inner shell to define an annular gap between the inner and outer shells. A plurality of fins are formed on the outer surface of the inner shell and project radially outward from the outer surface into the annular gap between the inner and outer shells. The fins define at least one flow path for conveying a fluid through the cooling jacket. At least one of the fins is positioned on the inner shell to extend in a direction circumferentially on the inner shell and substantially normal to the longitudinal axis so that the fluid flow path is directed generally circumferentially of the cooling jacket.

In another aspect, a liquid-cooled dynamoelectric machine of the invention comprises a stator having a longitudinal axis, a rotor and a shaft mounting the rotor for rotation in the stator about the axis. Two endshields are for connection at opposite longitudinal ends of the stator, at least one of the endshields having a surface for holding electronic components. An internal flow passage is generally adjacent the surface of the endshield for conveying a coolant to remove heat from the surface and thereby cool the electronic components.

Other objects and features of the present invention will be in part apparent and in part pointed out hereinafter.

BRIEF DESCRIPTION OF THE DRAWINGS

Corresponding reference characters indicate corresponding parts throughout the views of the drawings.

DETAILED DESCRIPTION OF THE PREFERRED EMBODIMENT

Referring now to the drawings and in particular to FIGS. 1–4, a dynamoelectric machine having a cooling system according to the present invention is designated in its entirety by the reference numeral 10. In one embodiment, the machine 10 is relatively compact and intended for installation in an engine compartment of an automotive vehicle for use as an integrated starter and generator. Although the description herein is primarily with reference to that embodiment, it is understood the other dynamoelectric machines, such as electric motors or generators of other sizes and for other fields of use, do not depart from the scope of this invention.

The machine 10 includes a stationary assembly or stator (generally designated 12) and a rotatable assembly or rotor (generally designated 14) magnetically coupled to the stator. As is known in the art, the stator holds one or more wire-wound coils, or windings, on a core. The windings may be encapsulated in a potting material (not shown). The machine 10 transforms electrical energy into mechanical torque, or vice versa, when the windings of the stator 12 are energized with electrical current and interact with the rotor 14 as it rotates. The stator has a generally cylindric outer surface 16. The rotor is rotatable about a shaft 18 which extends along a central longitudinal axis A and is mounted in the machine on two bearings 20. The stator 12 and rotor 14 are coaxially aligned, generally along the axis A. Many aspects of the stator and rotor described above are conventional and will not be described in further detail.

A front endshield 22 and a back endshield 24 define opposite longitudinal ends of the machine 10. The endshields 22, 24 are connected by several (e.g., three) circumferentially spaced bolt fasteners 26 which are received through corresponding bores 28 on each endshield. Mounting lugs 30 on the endshields 22, 24 are provided for receiving fasteners (not shown) to secure the machine 10 in a vehicle engine compartment. A grooved pulley 32 is positioned at a front end of the machine and is secured on the shaft 18 by a threaded nut 34. When the machine 10 functions as a motor, the pulley 32 transmits power from the shaft 18 to a drive belt (not shown). When the machine functions as a generator, the pulley 32 transmits power from the drive belt to the shaft 18.

A cooling jacket assembly, indicated generally at 40, is provided for receiving a liquid coolant (not shown) to remove heat energy from the machine 10. The jacket 40 includes an annular inner shell 42 and complementary annular outer shell 44 configured for nesting coaxial alignment (FIG. 3) to define an annular gap 46 between the inner and outer shells. A plurality of fins 50 are formed on an outer surface of the inner shell 42 which project radially outward from the outer surface of the inner shell through the annular gap 46 and engage the outer shell 44. The fins 50 define flow paths for conveying the coolant through the cooling jacket 40. The outer shell 44 comprises a cylindric tube surrounding the inner shell 42. Two O-ring seals 52 (FIG. 3) are received in corresponding grooves of the inner shell 42 for preventing leaks of coolant. The jacket 40 thereby contains coolant within the jacket. It is understood other arrangements, including systems where fins are formed on the outer shell or where the jacket has a one-piece construction without separate shells, do not depart from the scope of this invention.

The inner shell 42 has a cylindric inner surface defining a cavity for receiving the stator 12 so that the stator is in heat transfer contact with the cooling jacket 40. In one embodiment, the inner shell 42 is sized for an interference fit, having an inner diameter which is slightly less than a diameter of the outer surface of the stator 12. The stator 12 is secured in the inner shell 42 by first heating the inner shell to an elevated temperature. That causes thermal expansion sufficient so that the stator may be inserted in the inner shell to the installed position of FIG. 3. When the inner shell 42 cools, it contracts so that its inner surface is in tight engagement with the outer surface of the stator 12. The inner shell 42 is readily and economically manufactured by a suitable method such as casting in one piece. In one embodiment, the cooling jacket 40 is made of a thermally conductive material suitable for casting, such as aluminum. Jackets of other materials and constructions do not depart from the scope of this invention.

Figure 4:
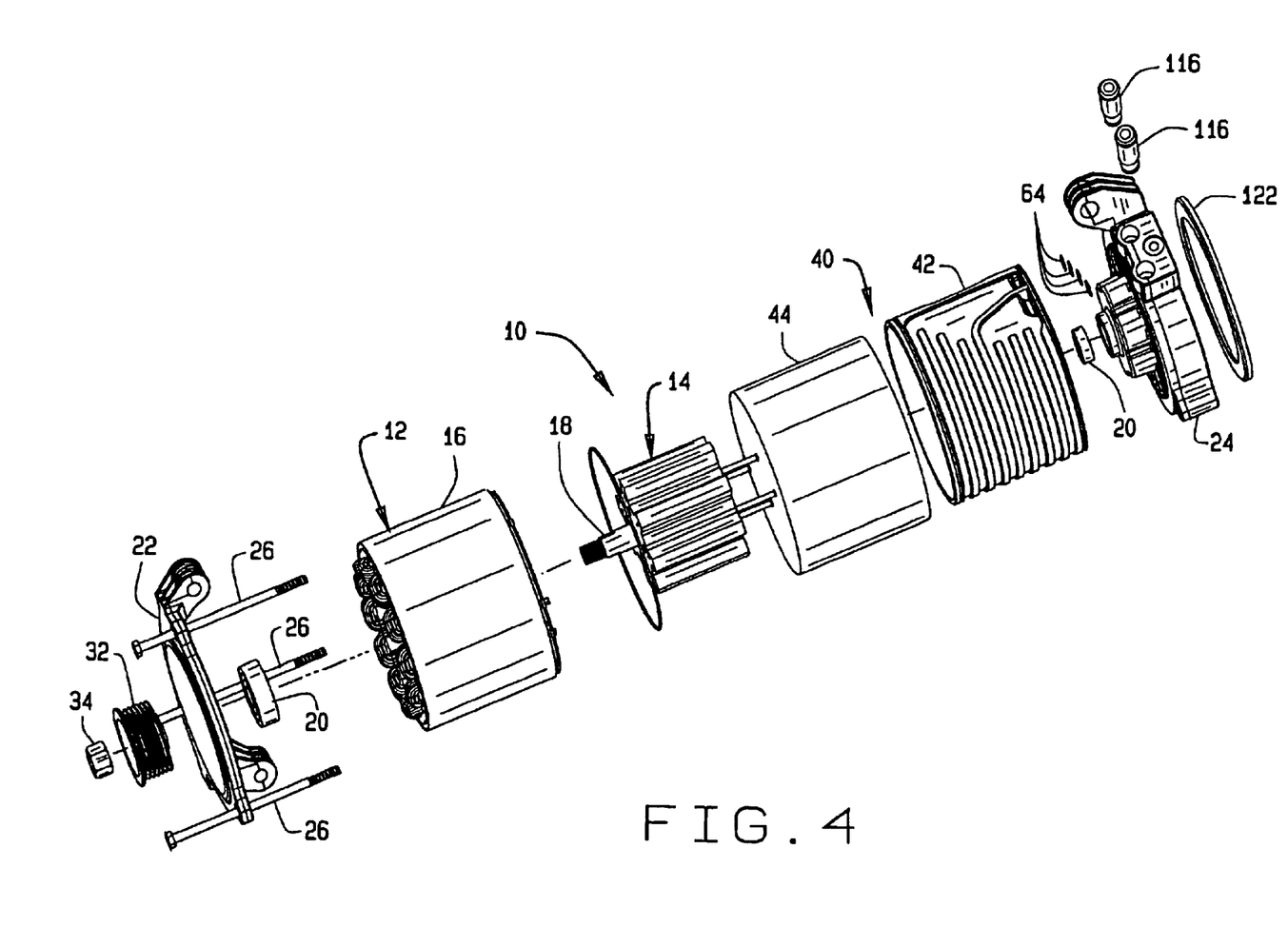
FIG. 4 is an exploded perspective of the machine showing component parts of the machine.
Figure 5:
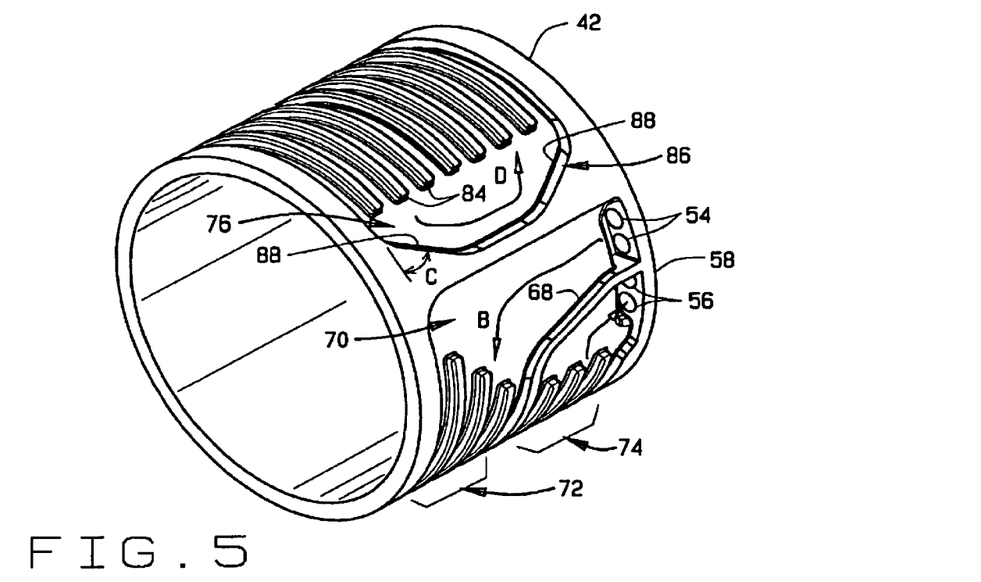
FIGS. 5 and 6 are perspectives of a cooling jacket for removing heat from the machine.
Figure 6:
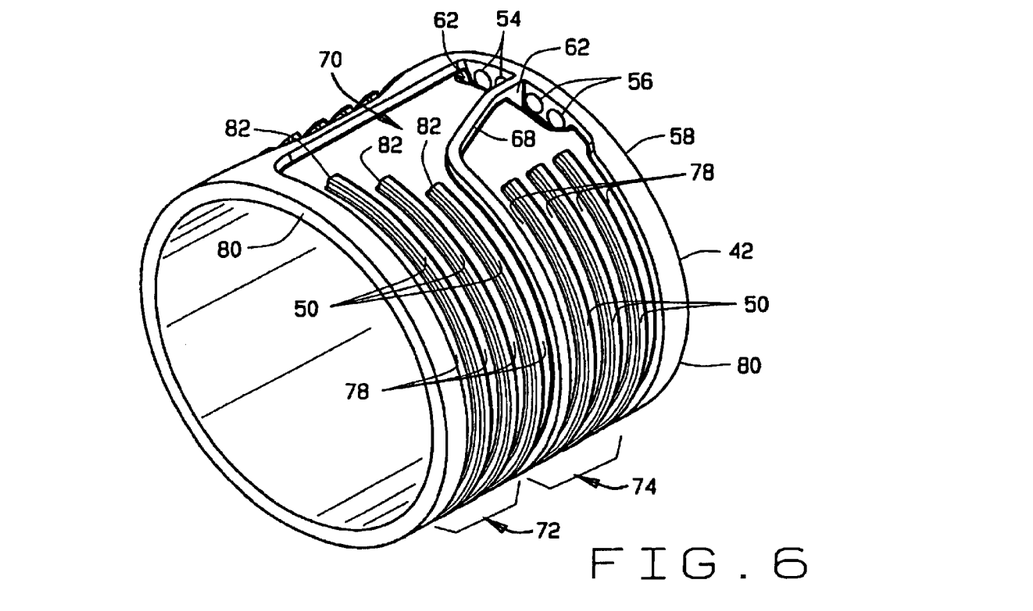

Referring to FIGS. 5 and 6, the inner shell 42 of the cooling jacket has two inlets 54 for receiving liquid coolant and two outlets 56 for discharging liquid coolant. Each of the inlets 54 and outlets 56 comprises a hole extending through a flange 58 in the back end of the cooling jacket 40, positioned to align with a respective transfer port 118, 120 (FIG. 7) on the back endshield 24. A recess 62 is formed in the outer surface of the inner shell 42, adjacent the flange 58, for locating the inlets 54 and outlets 56 so that coolant therefrom may flow to and from the annular gap 46. Preferably, all inlets 54 and outlets 56 are positioned in the same longitudinal end of the jacket 40. That provides a compact arrangement for favorable integration with the machine 10 and installation in a vehicle engine compartment because coolant intake and discharge connections are located nearby one another, at one side of the machine. Moreover, the positioning of inlets and outlets at a longitudinal end of the jacket permits ready sealing of the jacket. Four O-ring seals 64 (FIG. 4) are placed around respective inlets 54 and outlets 56, within grooves 66 (FIG. 7) on the back endshield 24, to sealingly engage the flat surface of the flange 58 around each inlet and outlet. This sealing arrangement is more effective than for a cooling jacket having an inlet or outlet which extends in a radial direction (i.e., in a circumferential side), which would necessarily pierce an outer shell along a curved surface and require more complex sealing. Jackets having other inlet and outlet configurations, and sealing arrangements, do not depart from the scope of this invention.

One of the fins comprises a dividing fin 68 (FIG. 6), which is positioned to separate the inlets 54 from the outlets 56 and prevent coolant from passing directly from inlet to outlet without traversing through a path of travel around the jacket 40. The dividing fin 68 extends from the recess 62 at an oblique angle to a position at approximately the longitudinal midpoint of the jacket 40, where the dividing fin curves to extend in the circumferential direction. Upon entering the cooling jacket 40 through the inlets 54, coolant flows into a distribution region, indicated generally at 70, having a relatively wide flow area free from fins. As the coolant flows in the direction of arrow B (FIG. 5), the flow area widens, further increasing flow area diffusion. Consequently, coolant velocity is relatively slower and generally uniform throughout the distribution region 70. The flow can effectively turn with little loss of pressure, and is uniformly distributed into equal-area flow segments, as described below. Because the flow of coolant is evenly distributed, local hot spots on the machine are avoided.

Downstream from the distribution region 70, the flow path includes a first circumferential segment (indicated generally at 72) for flow of fluid in a first circumferential direction around the jacket 40, followed by a second circumferential segment (indicated generally at 74) for flow of fluid in a second circumferential direction which is opposite to the first direction. A reversal region (indicated generally at 76) between the first and second segments turns flow from the first direction to the second direction. Coolant travels around the jacket 40 twice (i.e., around once through the first segment 72 and again through the second segment 74) to remove heat from the machine 10 before exiting the jacket.

In the embodiment shown in the drawings, the first flow path segment 72 comprises four parallel flow channels 78 defined by three parallel fins 50 positioned on the inner shell and by the dividing fin 68, all extending in a direction circumferentially on the inner shell and substantially normal to the longitudinal axis. The flow channels 78 are formed between adjacent fins 50, 68 and a rim 80 of the jacket and are directed generally circumferentially of the cooling jacket. The fins and channels are oriented to extend in directions preferably within a range of plus-or-minus five degrees from axial planes, that is, from planes which are normal to the longitudinal axis. More preferably, they are oriented at zero degrees and extend entirely within axial planes.

The flow channels 78 are configured to have approximately equal flow areas. The fins 50 decrease the flow area in the first segment 72 of the flow path so that velocity of coolant in the channels 78 is higher than in the distribution region 70. Consequently, convective heat transfer from the machine 10 to the coolant is increased. Heat is dissipated to coolant not only from a bottom of each channel 78, but also from its two lateral sides (i.e., from the fins). The fins 50 have leading edges 82 which are offset, being positioned in a circumferentially staggered arrangement (FIG. 6) in the distribution region 70. The leading edges 82 form intakes to the channels 78, and promote equal distribution of coolant to each channel. Trailing edges 84 (FIG. 5) of the fins are circumferentially aligned for depositing flows of coolant into the reversal region 76.

Similarly, the second flow path segment 74 has three parallel fins 50 positioned on the inner shell, extending in a direction circumferentially on the inner shell and substantially normal to the longitudinal axis. Four parallel flow channels 78 are formed between adjacent edges of the fins 50, the dividing fin 68, and the rim 80. Paths of travel in the second segment 74 are also directed generally circumferentially of the cooling jacket 40. It is understood that a different number or arrangement of flow paths does not depart from the scope of this invention. For example, the flow path could have only one segment so that coolant travels around the jacket only once, or each segment could have a number of channels greater or lesser than four and extend in directions which are not parallel to each other.

The cooling jacket 40 is configured so that all turns to which the coolant is exposed are generally smooth and gently curved to avoid flow separation and loss of coolant total pressure. The jacket has only one reversal region 76 so that coolant makes only one reversal turn in the jacket. That provides fewer turns or deflections than jackets with axial or helical passages to thereby inhibit loss of coolant pressure. The reversal region 76 is free of fins and configured to reduce pressure loss or avoid flow separations. A downstream wall 86 (FIG. 5) has a generally U-shape with two slanted surfaces 88 extending at an angle C relative to the longitudinal axis of the jacket, and an end surface 90 extending generally axially of the jacket. As coolant flow exits the channels 78 of the first segment 72 and is deposited in the reversal region 76, it slows because of the increased flow area. It is therefore able to turn as shown in arrow D in FIG. 5 with minimal loss in pressure, and be re-distributed in equal portions between flow channels 78 for travel back around the jacket 40 in the second segment 74 of the flow path. The angle C of each slanted surface 88 of the downstream wall 86 is preferably within a range from about 45 to 80 degrees, and more preferably about 60 degrees, so that coolant exiting the first segment 72 of the flow path makes an initial turn of about 60 degrees. Adequate area is provided in the reversal region 76 so that the separate flows of coolant from the four channels 78 do not impinge or intersect with each other in a way causing strong turbulence, but rather tend to initially remain parallel in the reversal region.

Figure 10:
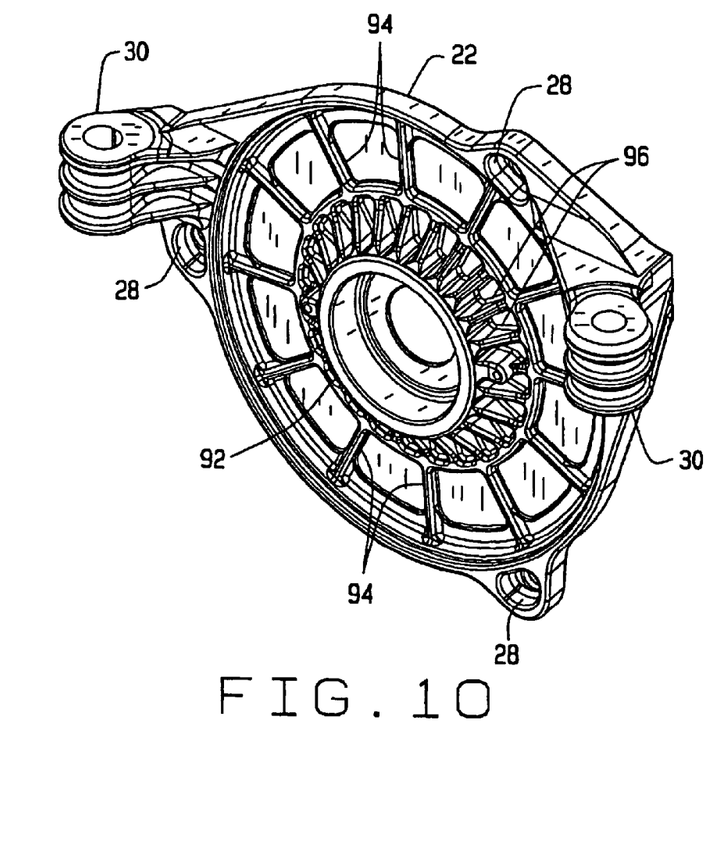
FIG. 10 is a first perspective of a front endshield of the machine.
Figure 11:
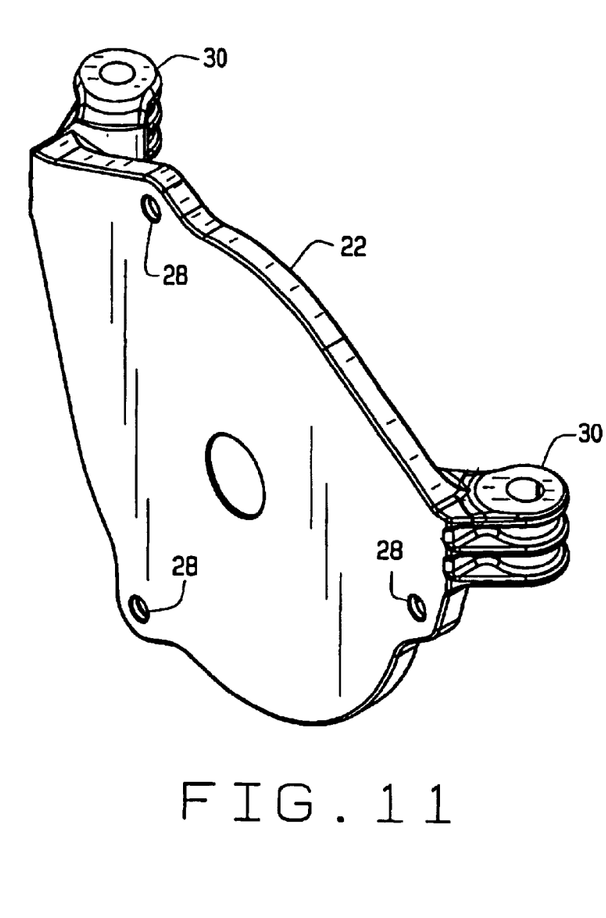
FIG. 11 is a second perspective of the front endshield of FIG. 10.

The front endshield 22 is shown in FIGS. 10 and 11. A circular hub 92 for receiving one of the bearings 20 is supported by radial ribs 94 and gussets 96. As many aspects of the front endshield 22 are conventional, it will not be described in further detail.

Figure 7:
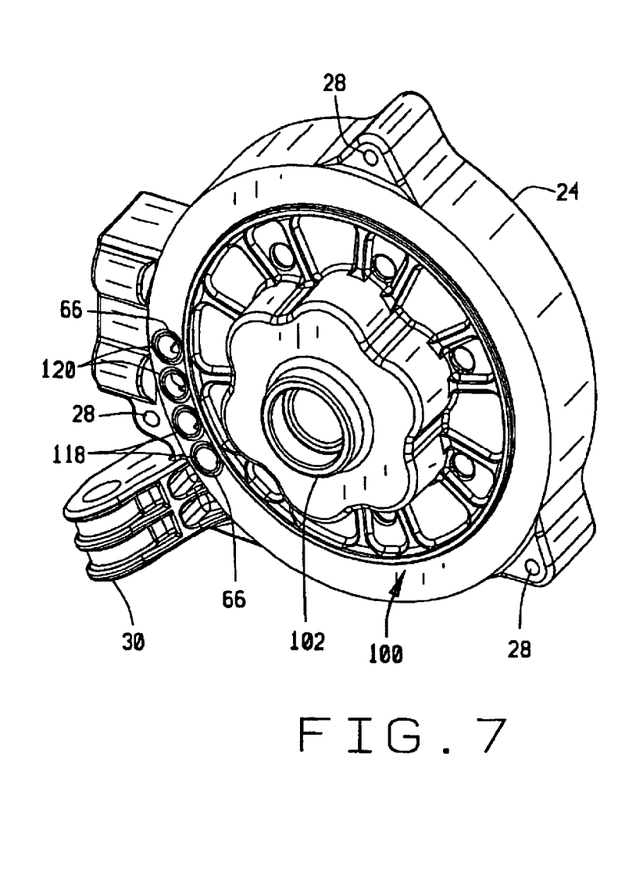
FIG. 7 is a first perspective of a back endshield of the machine.
Figure 8:
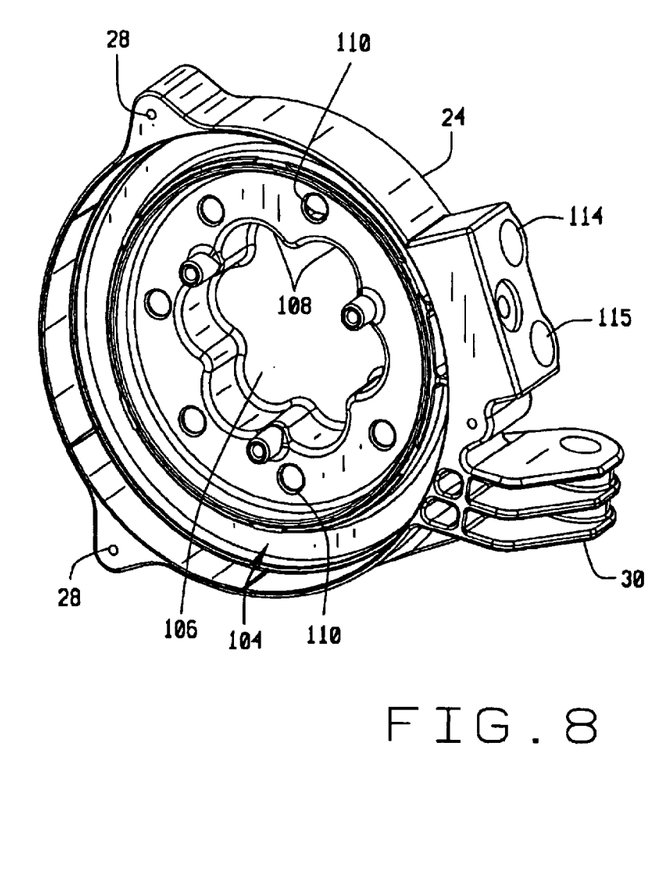
FIG. 8 is a second perspective of the back endshield of FIG. 7.
Figure 9:
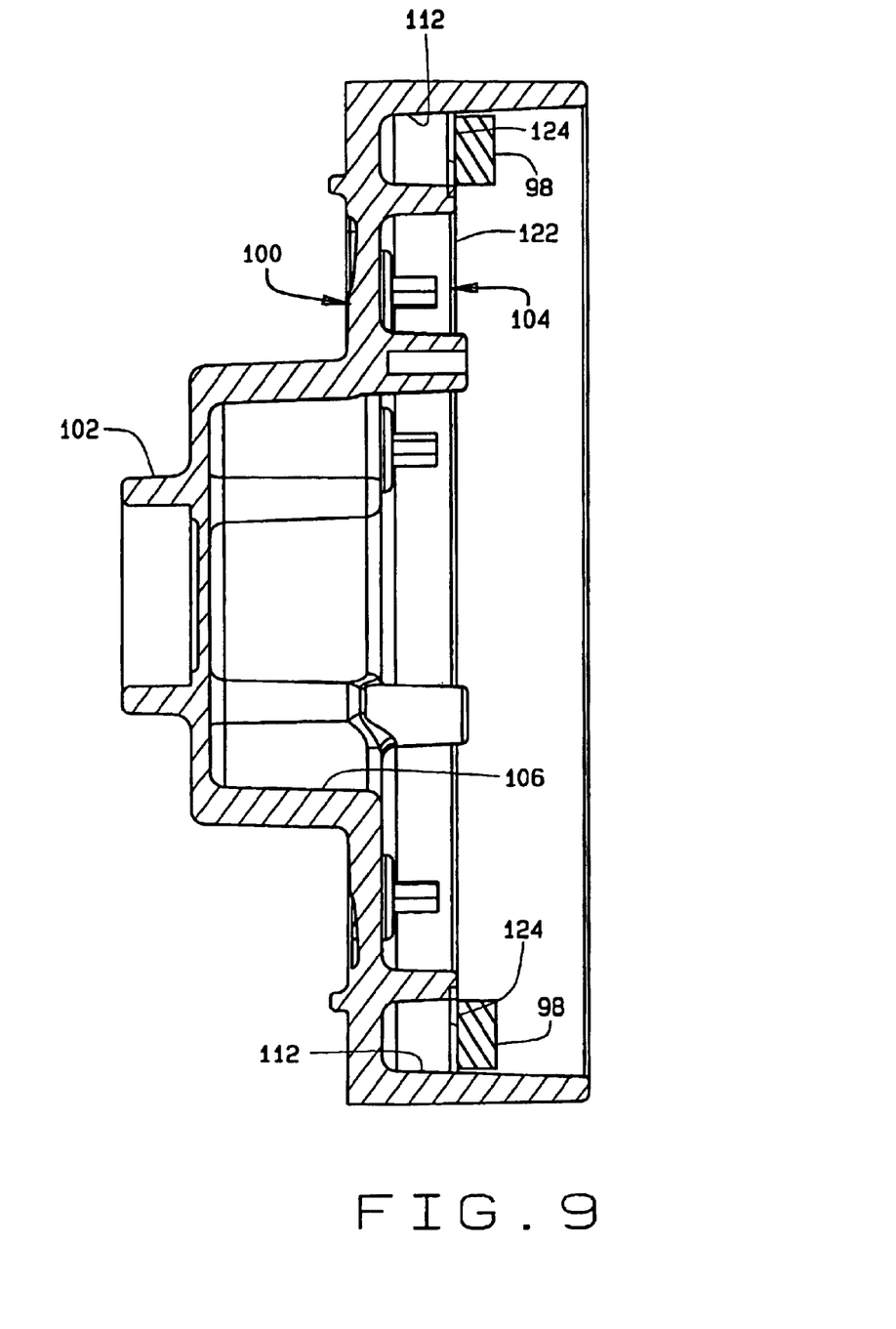
FIG. 9 is a schematic elevational section taken through the back endshield of FIGS. 7 and 8.

Referring to FIGS. 7–9, the back endshield 24 comprises a housing adapted for mounting and cooling electronic components 98 (shown schematically in FIG. 9) which are associated with the machine 10, such as controls. The endshield 24 has an inner side 100 (facing toward the machine 10) with a circular hub 102 for receiving one of the bearings 20 to support the rotor shaft 18. An outer side 104 (facing away from the machine) has a cavity 106 with several (e.g., six) arcuate, crescent-shaped edges 108 for receiving a plurality of cylindric capacitors (not shown). Holes 110 in the endshield 24 are for routing electrical connections (not shown) to the windings of the stator 12.

Figure 1:
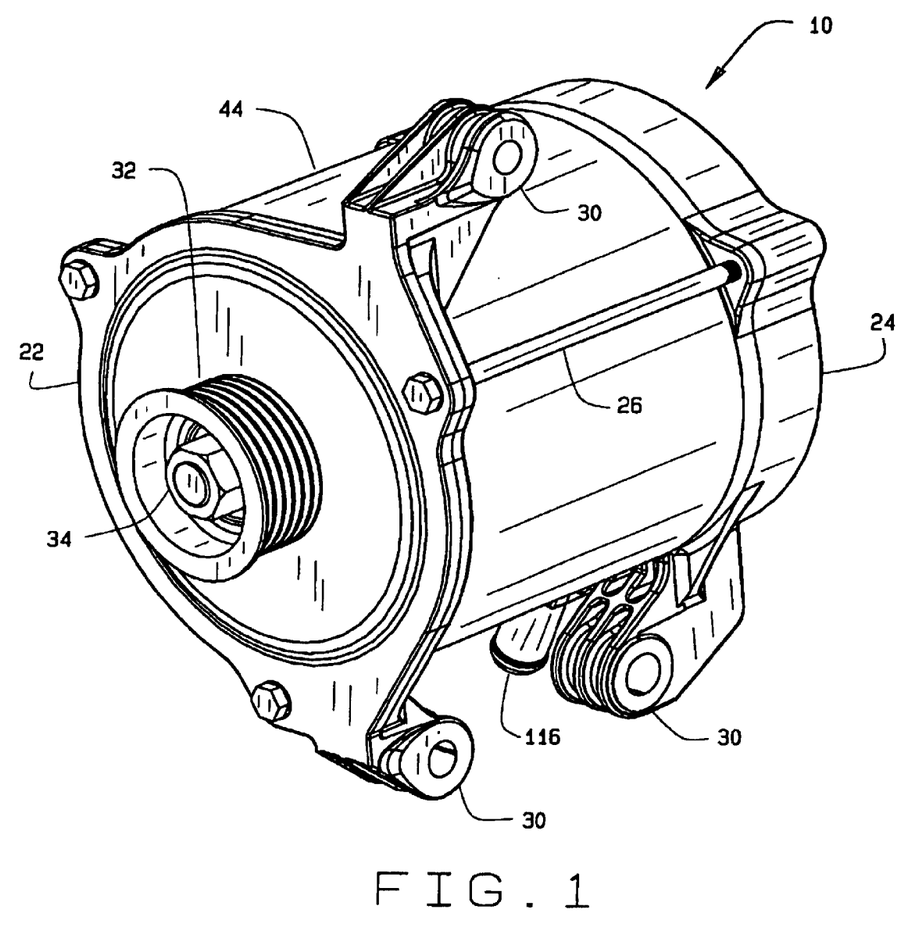
FIG. 1 is a perspective of a dynamoelectric machine having a cooling system of the present invention.
Figure 2:
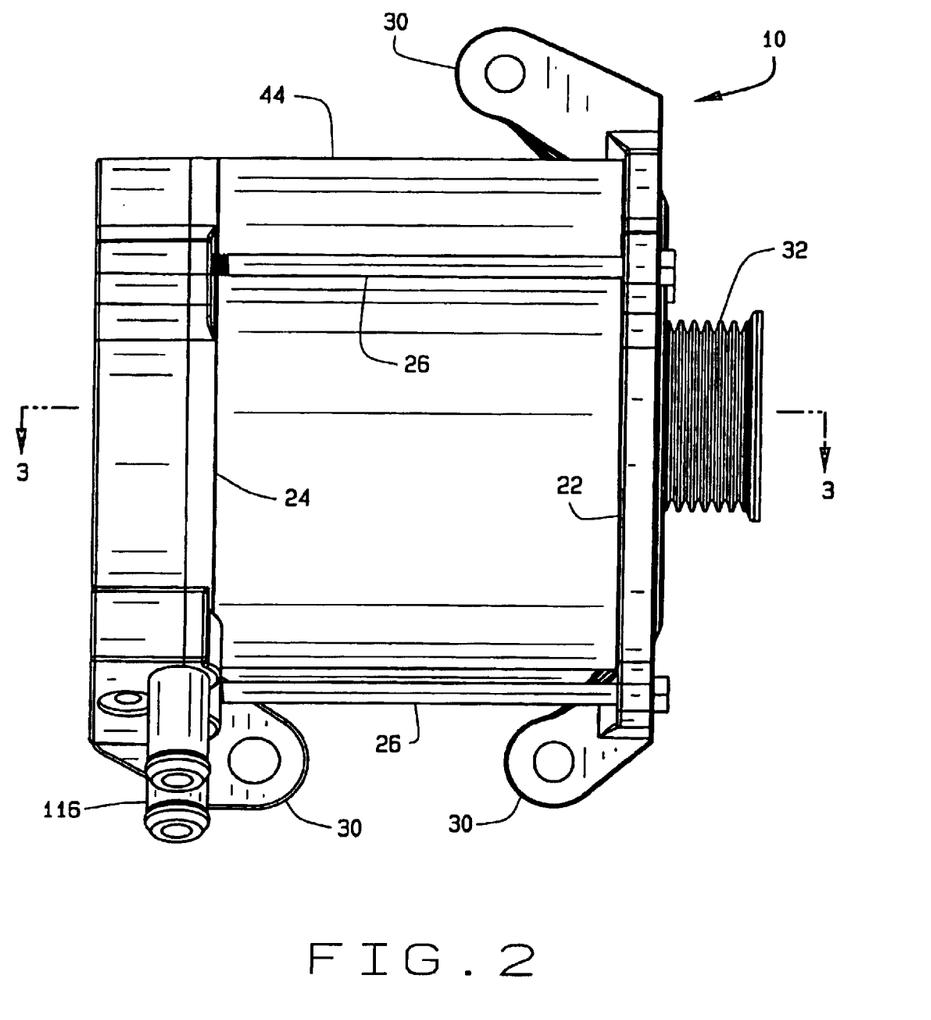
FIG. 2 is an elevation of the machine of FIG. 1.
Figure 3:
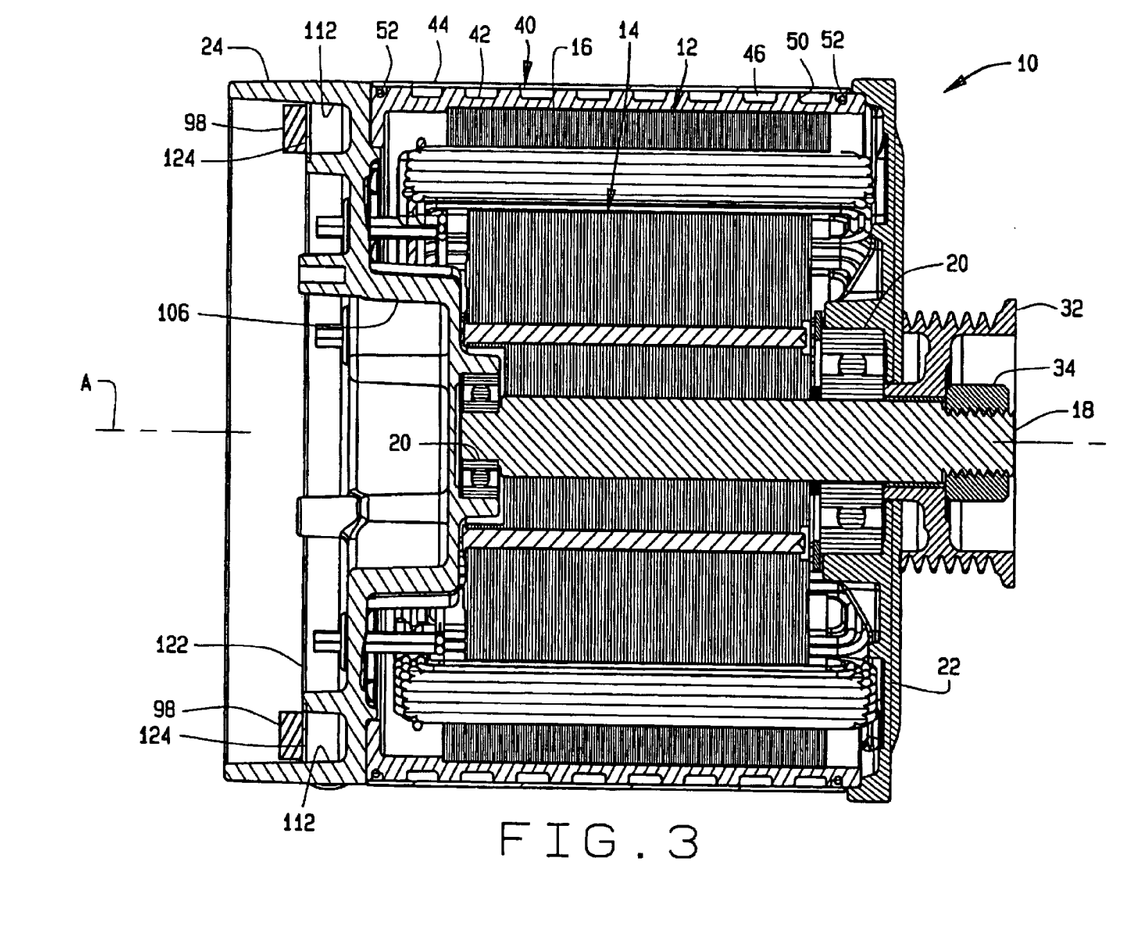
FIG. 3 is a schematic section on line 3—3 of FIG. 2.

The outer side 104 of the endshield 24 has an annular channel which forms a passage 112 for flow of coolant around the endshield. An inlet port 114 and an outlet port 115 for the flow passage 112 are provided for connection to corresponding fittings 116 (FIG. 4) for receiving and discharging coolant. Two transfer ports 118 are for alignment with corresponding two inlets 54 of the cooling jacket 40, and two transfer ports 120 are for alignment with corresponding two outlets 56 of the cooling jacket. The transfer ports 118, 120 (FIG. 7) extend through the inner side 100 of the endshield 24 and are in fluid communication with the passage 112. When installed, the back endshield 24 engages the inner shell 42 of the cooling jacket as shown in FIG. 3, with the transfer ports 118, 120 connecting the flow passage 112 of the endshield and the flow path segments 72, 74 of the cooling jacket.

As shown in FIGS. 4 and 9, a flat annular body or ring 122 is mounted on the outer side 104 of the endshield 24 to enclose the channel which forms passage 112. The ring 122 is in heat transfer communication with coolant as it flows through the passage 112. An outer face of ring 122 defines a surface 124 for mounting the electronic components 98 by suitable attachment. The ring 122 is formed of a rigid and thermally conductive material (e.g., aluminum) so that heat energy from the electronics is transferred through the ring to the coolant.

In operation, liquid coolant flows from a coolant supply and pump (not shown) into the inlet port 114 of the back endshield 24. Coolant travels through the passage 112, making one revolution around the endshield 24 to remove heat from electronic components 98 mounted on the surface 124 of the ring 122. Next, the coolant moves through two transfer ports 118 into the inlets 54 of the cooling jacket 40 and travels through the jacket as previously described to remove heat from the stator 12. Finally, the coolant exits the jacket 40 through the outlets 56 and travels through two corresponding transfer ports 120 of the endshield and to the outlet port 115 for discharge.

Thus, the back endshield 24 facilitates a compact system with electronic components 98 integrated with the machine 10, and provides for integrated cooling of the electronic components. Coolant travels in series around the endshield and then through the cooling jacket 40 to remove heat sequentially from the electronic components and the stator of the machine. Alternatively, the coolant could be routed first through the cooling jacket and then to the endshield. Other endshield designs and flow path arrangements do not depart from the scope of this invention. For example, the passage and surface may have non-annular shapes, or may be positioned elsewhere about the machine 10. Moreover, the passage need not be internal in the endshield (e.g. along an end face of the cooling jacket and adjacent to the surface).

In view of the above, it will be seen that the several objects of the invention are achieved and other advantageous results obtained.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A cooling jacket for cooling a stator of a dynamoelectric machine, the jacket comprising:
    an annular inner shell having a generally cylindric inner surface defining a cavity for receiving said stator so that the stator is in heat transfer contact with said inner surface, the inner shell having a central longitudinal axis and an outer surface;
    an annular outer shell for nesting coaxial alignment with the inner shell to define an annular gap between the inner and outer shells; and
    a plurality of fins formed on the outer surface of the inner shell and projecting radially outward from the outer surface into the annular gap between the inner and outer shells, said fins defining at least one flow path for conveying a fluid through the cooling jacket;
    wherein at least one of the fins is positioned on the inner shell to extend in a direction circumferentially on the inner shell and substantially normal to the longitudinal axis so that the fluid flow path is directed generally circumferentially of the cooling jacket.

2. A cooling jacket as set forth in claim 1 wherein said fins are configured such that said flow path includes a first segment for flow of fluid in a first circumferential direction, a second segment for flow of fluid in a second circumferential direction opposite to the first direction, and a reversal region between said first and second flow path segments for turning flow from the first direction to the second direction.

3. A cooling jacket as set forth in claim 2 wherein the cooling jacket has only one reversal region so that fluid makes only one reversal turn in the jacket.

4. A cooling jacket as set forth in claim 2 wherein said first and second flow path segments each comprises at least two parallel flow channels.

5. A cooling jacket as set forth in claim 4 further comprising a distribution region upstream in the flow of the first flow path segment for distributing fluid between said channels of the first flow path segment.

6. A cooling jacket as set forth in claim 5 wherein the distribution region comprises intakes to said channels formed by fins having leading edges in an offset arrangement.

7. A cooling jacket as set forth in claim 1 wherein the inner shell has opposite longitudinal ends, and wherein the cooling jacket has an inlet and an outlet positioned at one of the longitudinal ends.

8. In combination, a cooling jacket as set forth in claim 1 and an endshield of said dynamoelectric machine, the endshield comprising a housing adapted for engagement with the inner shell and having a fluid flow passage for fluid communication with the cooling jacket.

9. A combination as set forth in claim 8 wherein the endshield further comprises transfer ports for connecting the flow passage of the endshield with the flow path of the cooling jacket in fluid communication.

10. A combination as set forth in claim 9 wherein the inner shell of the cooling jacket has opposite longitudinal ends, and wherein the cooling jacket further comprises a fluid inlet and an outlet positioned at one of the longitudinal ends, said transfer ports being positioned for alignment with the inlet and outlet of the cooling jacket.

11. A combination as set forth in claim 8 wherein the endshield further comprises a surface for mounting electronic components, the fluid flow passage of the endshield extending generally adjacent the surface to thereby cool said electronic components.

12. A liquid-cooled dynamoelectric machine comprising:
    a stator having a longitudinal axis;
    a rotor and a shaft mounting the rotor for rotation in the stator about said axis; and
    two endshields for connection at opposite longitudinal ends of the stator, at least one of the endshields having a surface for holding electronic components; and
    an internal flow passage generally adjacent said surface of the endshield for conveying a coolant to remove heat from the surface and thereby cool said electronic components.

13. A dynamoelectric machine as set forth in claim 12 wherein said flow passage is within the endshield to convey coolant through the endshield.

14. A dynamoelectric machine as set forth in claim 13 wherein the flow passage is generally annular around the endshield.

15. A dynamoelectric machine as set forth in claim 12 further comprising a cooling jacket for removing heat from the machine, the jacket having a flow path therethrough in fluid communication with said flow passage and serially arranged therewith for conveying coolant.

* * * * *